Nov. 14, 1933.   L. ARTERBURN   1,934,783
FAN
Filed April 13, 1931
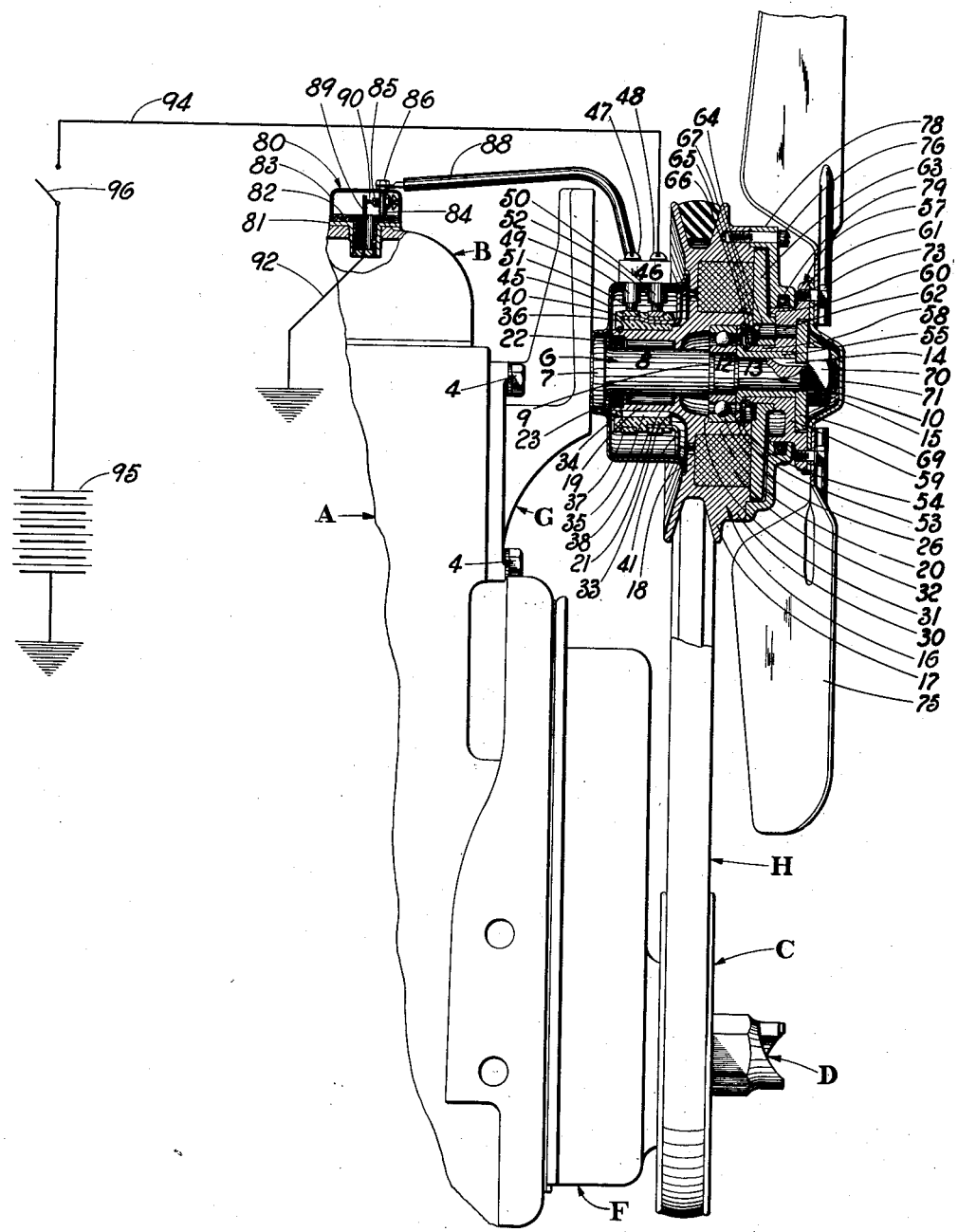
INVENTOR.
Lloyd Arterburn
BY
P. W. Pemberoy J. M. Colvin
ATTORNEYS.

Patented Nov. 14, 1933

1,934,783

UNITED STATES PATENT OFFICE 1,934,783

FAN

Lloyd Arterburn, South Bend, Ind., assignor to The Studebaker Corporation, South Bend, Ind., a corporation of New Jersey Application April 13, 1931. Serial No. 529,651

5 Claims. (Cl. 123—171)

This invention relates to an automatic clutch device and has for its principal object the provision of means for discontinuing the action of the cooling fan of an internal combustion engine such as is used in automobiles, whenever the function of the fan is not essential to proper cooling of the engine.

Another object is to provide an automatically actuated clutch mechanism for interrupting the transmission of power from the fan belt to the fan of an automobile engine.

A still further object is to provide an automatic electric clutch for the fan, and a sensitive instrument for sensing the temperature of the engine and actuating the clutch to discontinue the action of the fan whenever the temperature of the engine is below a predetermined limit.

It is a well known fact that the operation of the cooling fan of an internal combustion engine such as is used in automobiles, absorbs a very considerable percentage of the power of the engine and that this percentage increases with the speed of the engine often amounting to as much as 15% of the developed horse power of the engine. It is also well known that in cold weather the action of the fan is a distinct disadvantage as it increases the tendency of the cooling fluid of the engine to freeze and so lowers the temperature of the engine that proper combustion of the fuel cannot be obtained, and causes the lubricating oil to become too viscous to properly lubricate the moving parts. Also when the automobile is moving at high speeds, the flow of air through the radiator is sufficient to effect proper cooling without the action of the fan, which in this case serves only to place an additional power load on the engine.

It is therefore obvious that many advantages will accrue from discontinuance of the action of the fan when such action is not necessary. In cold weather it would no longer be necessary to cover the radiator or remove the fan belt in order to avoid slow starting and excessive use of the choke, and at high speeds the power of the engine would be considerably increased, its operation would be improved and the fan would be relieved of a considerable amount of strain incident to high speed operation.

Having thus stated the objects and some of the advantages of my invention; for the purpose of enabling those skilled in the art to arrive at a rapid understanding of the construction and mode of operation of the same, it will now be briefly described.

In the accompanying drawing in which like numerals are employed to designate like parts throughout, the single figure shows a preferred form in which my invention may be embodied in an actual mechanism. It is to be understood however, that the invention may be embodied in different mechanical constructions and is to be limited only by the scope of the subjoined claims.

In the illustration shown, A generally designates the front portion of an internal combustion engine such as is used to furnish power for automotive vehicles. B designates a conduit for cooling fluid, mounted at the top of the engine and communicating with the water jacket surrounding the cylinders and valve structure of the engine. At the lower part of the engine is a fanbelt pulley C mounted upon a rotatable shaft D projecting from the timing gear housing F of the engine. Secured upon the upper part of the engine A by means of stud bolts 4 or other equivalent means, is a bracket G adapted to carry the fan structure. The bracket G is formed with a vertical slot, not shown, whereby the entire fan structure may be raised or lowered to adjust the tension of the fan belt H.

So far the structure is entirely conventional and it is believed that thus briefly mentioning the parts involved is all that is necessary for the purpose of this description, as the subject matter of this invention is completely contained within the fan structure mounted upon the bracket G and in a remote control means therefor.

Adjustably mounted in the vertical slot in the bracket G is one end of a fixed fan shaft generally indicated at 6. This fan shaft 6 is formed with an annular enlargement or collar 7 adjacent to the portion that is mounted in the bracket G. Extending outwardly from the annular enlargement 7, the fan shaft 6 is formed with a smooth cylindrical portion 8 terminated by an annular groove 9 located at approximately one-half the length of the fan shaft. Spaced outwardly from the groove 9 is a second annular groove 10 and between the two grooves 9 and 10, is a cylindrical portion 12 of somewhat less diameter than the cylindrical portion 8. Extending outwardly from the groove 10 is a cylindrical portion 13 of somewhat less diameter than the cylindrical portion 12. The cylindrical portion 13 extends to the outer end of the fan shaft 6 and in this outer end are provided a key-way 14 and screw threads 15.

Mounted upon the fan shaft 6 is a rotatable member generally indicated at 16 which comprises, a V-shaped fan-belt pulley 17 having a web 18, and two bearing sleeves 19 and 20 extending upon either side of the web. The bearing sleeve 19 overlies the cylindrical portion 8 of the fan shaft 6 and between the cylindrical portion 8 and the inner surface of the bearing sleeve 19 are anti-friction rollers 23. The rollers 23 abut at one end against a radial flange 21 formed interiorly of the bearing sleeve 19 and at the other end against an oil seal washer 22 inserted in the end of the bearing sleeve. The bearing sleeve 20 overlies the cylindrical portion 12 of the fan shaft 6 and extends somewhat forwardly thereof and inserted between the cylindrical portion 12 and the inner surface of the bearing sleeve 20, is an anti-friction bearing 26, comprising inner and outer ball races, and bearing balls, which is retained in place by a shoulder 31 on the bearing sleeve 20 and a thrust washer 53 bearing against the outer edge of the outer ball race, the thrust washer being retained in position by a snap ring 54 fitted in a groove in the bearing sleeve 20. Between this anti-friction bearing and the radial flange 21, is an annular chamber that serves as a reservoir for lubricant.

Integrally formed upon the outer portion of the web 18 is a flange 30 overlying and in radial alignment with the bearing sleeve 20. From an inspection of the drawing it will be seen that the bearing sleeve 20, the web 18 and the flange member 16 enclose three sides of a space in the form of a torus having a rectangular cross section. Mounted within this space is a doughnut-shaped electro-magnetic coil 32. Secured upon the bearing sleeve 19 by means of a shoulder 33 and a snap ring 34, and prevented from rotation relative to the sleeve 19 by means of a key 35, is a collar 36 formed of insulating material. About the outer surface of the collar 36 are contact rings 37 and 38. Extending through the collar 36 from the contact rings 37 and 38 are conductor bars 40 and 41 respectively. These conductor bars 40 and 41 are connected through apertures in the web 18 with leads from the electro-magnetic coil 32.

Mounted upon the enlarged annular portion 7 of the fan shaft 6 and extending around the collar 36 into contact with the fan-belt pulley 17, is a cup-shaped member 45, and mounted upon the top of this cup-shaped member is an insulating block 46 carrying contact screws 47 and 48 and tubular members 49 and 50 extending through apertures in the top of the cup-shaped member 45. Telescopically received in the tubular members 49 and 50, are contact brushes 51 and 52 which are spring pressed into contact with the contact rings 37 and 38 respectively, electrically connecting the rings with the contact screws 47 and 48 for a purpose to be later described.

Mounted upon the outer end of the fan shaft 6 is a bushing 55 having a flanged end bearing against the outer side of the inner ball race, and rotatably mounted upon the sleeve 55 is a member generally indicated at 57, which comprises, a sleeve 58, a radial portion 59, an axial flange 60 and an outer radial portion 61 having a vertical face. Mounted in the radial portion 59 are pins 62 having ends extending rearwardly from the radial portion, and mounted upon the sleeve 58 and having a slight axial motion relative thereto, is a disk member 63 having apertures 64 therein to receive the projecting ends of the pins 62. The disk 63 is of such dimensions as to overlie the electro-magnetic coil 32 and a part of the outer flange 30. Surrounding the sleeve 58 immediately inward of the inner face of the disk 63 is a thrust washer 65 retained in position on the sleeve by a snap ring 66, and between this thrust washer and the inner face of the disk 63 is a small leaf spring 67 that thrusts the disk 63 outwardly along the shaft 6 and away from the coil 32.

Mounted upon the fan shaft outwardly of the sleeve 55 and member 57, is a thrust washer 69 having a tongue projecting into the key-way 14, and held against the outer end of the sleeve 55 by a nut 70 screwed on the threads 15 on the end of the fan shaft 6.

Secured against the flat vertical face of the radial portion 61 of the member 57 is a cup-shaped plate 71 which covers the nut 70 and the end of the shaft 6, and is firmly fastened to the radial flange 61 by stud bolts 73 which also secure the fan blades 75 to the radial flange 61 of the member 57.

Secured to the forward edge of the flange 30 by means of the stud bolts 76 is an apertured disk 78. The radial portion of this disk covers the disk 63 and the aperture fits over the flange 60 of the member 57. Within the aperture of the disk 78 there is provided a groove 79, within which there is a ring of packing material to form an oil seal between the relatively rotatable members 57 and 78.

Fixed upon the cooling fluid conduit B and having a well extending into the conduit, is a thermostatic instrument generally indicated at 80. The instrument comprises, a member 81 having a radial portion at one end and a screw threaded tubular portion adapted to be screwed into a screw threaded aperture in the conduit B. Mounted upon the member 81 is a member 82 of insulating material having a tubular portion closed at the lower end extending into the tubular portion of the member 81, and a radial flange surrounding the upper end of the tubular portion lying upon the radial flange of the member 81. Secured upon the radial flange of the member 82 is an inverted cup-shaped member 83 which serves as a cover for the instrument.

Mounted upon the radial flange of the member 82 is a post member 84 which carries interiorly of the cup-shaped member 83, an adjustable contact 85. This post 84 extends through an aperture in the cup-shaped member 83 and is screw threaded at the upper end to accommodate nuts 86 which constitute a binding post for an electric conduit 88.

Mounted upon the closed lower end of the tubular portion of the member 82 is a small bi-metallic thermostat 89 which extends vertically upward and carries a contact 90 opposite the adjustable contact element 85. The lower end of this thermostatic element 89 is electrically grounded to the motor, as shown at 92, and the conduit 88 leads from the post 84 to the contact screw 47. Also there is an electric circuit from the battery 95 through the ignition switch 96 to the contact post 48.

The operation of this device is as follows: assuming that the motor is started when cool, the thermostat 89 will be in the position shown in the illustration in which the contact between the thermostat and the contact element 85 is broken. Therefore, no current will flow through the circuits 88 and 94. The coil 32 will not be energized and the spring 67 will hold the disk 63 away from the coil and the faces of the flanges 20 and 30. In this position the fan belt will rotate the member 16 but the disk 63, member 57 and fan 75 will remain at rest.

As the temperature of the fluid in the cooling system increases, a limit will be reached at which the thermostat 89 moves over to contact the element 85, thereby establishing an electric circuit from the battery 95 through the ignition switch 96, contact screw 48, brush 52, ring 38 and conducting bar 41 to the coil 32, and from the coil 32 through the conducting bar 40 to the ring 37, brush 51, contact screw 47, lead 88, and through the thermostatic instrument to the ground at 92. The coil 32 is thereby energized, the disk 63 acts as an armature and is drawn against the resistance of the spring 67 into contact with the coil 32 and outer faces of the flanges 20 and 30, thereby providing a driving connection between the member 16 which carries the fan-belt pulley 17 and the member 57 which carries the fan blades 75. The fan will now operate to prevent a further rise in the temperature of the cooling fluid.

Having now fully described my invention and the method of operation of the same so that its construction and use will be clearly apparent to others skilled in the art, what I desire to protect by Letters Patent of the United States, is as follows:

1. In combination with the cooling fan of an internal combustion engine, a fixed fan shaft upon which said fan is rotatably but axially immovably mounted, a power drive rotatably but axially immovably mounted on said fan shaft free of said fan, a clutch member slidably and rotatably mounted on said fan shaft operatively connected with said fan and releasably engageable with said power drive to provide a releasable driving connection between said fan and said power drive, electro-magnetic means associated with said power drive to provide a fan driving connection between said power drive and said clutch member, and means responsive to the temperature of said engine for energizing said electromagnetic means whenever the temperature of the engine is above a predetermined limit.

2. In a clutch driven cooling fan for an internal combustion engine, a fan shaft supported on said engine, a fan belt pulley having oppositely extending bearing sleeves rotatably mounted on said shaft, a fan blade support having a bearing sleeve rotatably mounted on said shaft, pins secured in said fan blade support having ends projecting therefrom, a disk slidably mounted adjacent to said fan blade support having apertures receiving the projecting ends of said pins, and an electro-magnetic coil in said fan belt pulley for moving said disk into engagement with said coil and said pulley to provide a driving connection therebetween.

3. In a clutch driven cooling fan for an internal combustion engine, a fan shaft supported on said engine, a fan belt pulley having oppositely extending bearing sleeves rotatably mounted on said shaft, a fan blade support having a bearing sleeve rotatably mounted on said shaft, pins secured in said fan blade support having ends projecting therefrom, a disk slidably mounted adjacent to said fan blade support having apertures receiving the projecting ends of said pins, an electro-magnetic coil in said fan belt pulley for moving said disk into engagement with said coil and said pulley to provide a driving connection therebetween, and a leaf spring inserted between said pulley and said disk to move said disk out of engagement with said pulley.

4. In a clutch driven cooling fan for an internal combustion engine, a fan shaft supported on said engine, a fan-belt pulley rotatably mounted on said shaft, oppositely extending bearing sleeves on said pulley, an electro-magnetic coil in said pulley, a fan blade support rotatably mounted upon said shaft, a disk operatively connected to said fan blade support and releasably engageable with said pulley upon energization of said coil, an insulating sleeve secured upon one of said bearing sleeves, and ring contacts carried by said insulating sleeve to provide an energizing circuit for said coil.

5. In a clutch driven cooling fan for an internal combustion engine, a fan shaft supported on said engine, a fan belt pulley rotatable on said shaft, oppositely extending bearing sleeves on said pulley, an electro-magnetic coil in said pulley, an insulating sleeve secured upon one of said bearing sleeves, ring contacts carried by said insulating sleeve, a cover member having one end secured to said shaft and the other end adjacent to said pulley, and terminal members mounted on said cover member carrying brushes engageable with said ring contact members.

LLOYD ARTERBURN.